(12) United States Patent
Krasilnikov

(10) Patent No.: US 9,283,143 B2
(45) Date of Patent: *Mar. 15, 2016

(54) MOBILE SAUNA

(71) Applicant: Nikita Krasilnikov, Quincy, MA (US)

(72) Inventor: Nikita Krasilnikov, Quincy, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/615,551

(22) Filed: Feb. 6, 2015

(65) Prior Publication Data

US 2015/0150756 A1 Jun. 4, 2015

Related U.S. Application Data

(63) Continuation-in-part of application No. 13/374,044, filed on Dec. 8, 2011, now Pat. No. 8,950,018.

(51) Int. Cl.
*A61H 33/06* (2006.01)
*B60P 3/36* (2006.01)
*B60R 15/00* (2006.01)

(52) U.S. Cl.
CPC ............ *A61H 33/063* (2013.01); *A61H 33/066* (2013.01); *A61H 33/067* (2013.01); *B60P 3/36* (2013.01); *A61H 2201/0157* (2013.01); *B60R 15/00* (2013.01)

(58) Field of Classification Search
CPC ....................................................... A61H 33/06
USPC ................................ 4/524–534, 476; 601/66
See application file for complete search history.

(56) References Cited

U.S. PATENT DOCUMENTS

| 3,007,178 | A | 11/1961 | Altman et al. |
| 3,588,470 | A | 6/1971 | Husband |
| 4,034,204 | A | 7/1977 | Windsor et al. |
| 4,518,847 | A | 5/1985 | Horst, Sr. et al. |
| 4,959,527 | A | 9/1990 | Kivimaa et al. |
| 5,511,254 | A | 4/1996 | O'Brien |
| 7,481,234 | B1 | 1/2009 | Gustafson et al. |
| 7,559,095 | B2 | 7/2009 | Tei et al. |
| 8,950,018 | B2 * | 2/2015 | Krasilnikov ...................... 4/524 |
| 2011/0113545 | A1 | 5/2011 | Driessen |

FOREIGN PATENT DOCUMENTS

EP 0300577 A1 1/1989
EP 0676185 A2 10/1995

* cited by examiner

*Primary Examiner* — Lori Baker
(74) *Attorney, Agent, or Firm* — Hayes Soloway, P.C.

(57) ABSTRACT

A mobile sauna apparatus and related methods are provided. The mobile sauna apparatus includes a mobile vehicle having a vehicle body with a floor, roof and sidewalls. A sauna is mounted in the vehicle, the sauna having a heater with a heater orifice, and an extension from the heater orifice through one of the sidewalls of the vehicle and opening to the exterior of the vehicle. A stove pipe is mounted above the heater, the stove pipe surrounded by an insulating material, wherein the stove pipe extends through at least one of: the roof of the vehicle and one of the sidewalls of the vehicle, and wherein the insulating material is positioned between the stove pipe and the at least one of: the roof of the vehicle and the sidewall of the vehicle.

20 Claims, 6 Drawing Sheets

US 9,283,143 B2

MOBILE SAUNA

CROSS REFERENCE TO RELATED APPLICATION

This application is a Continuation-in-Part of U.S. Application Ser. No. 13/374,044 entitled "RV Mounted Sauna" filed Dec. 8, 2011, the entire disclosure of which is incorporated herein by reference.

FIELD OF THE DISCLOSURE

The present disclosure is generally related to saunas and more particularly is related to a mobile sauna carried by a vehicle.

BACKGROUND OF THE DISCLOSURE

As is common throughout Northern countries and/or European countries and most of the Baltic countries, saunas are utilized both for pleasure and for therapeutic value. Saunas in Northern countries and/or European countries are conveniently located near ponds or places where people recreate so that people participating in the sauna may bathe in the cold weather of an adjacent lake or roll in the snow adjacent to the sauna. Moreover, saunas are positioned in the wintertime near fishing shacks or ice fishing facilities such that after the sauna the individual can jump through a hole in the ice, thereby achieving the therapeutic benefit of being heated to high degree and then experiencing a rapid drop in temperature.

Another typical characteristic of saunas in Northern countries and/or European countries is that saunas are often wood-fired and are heated to a temperature in excess of 260 degrees Fahrenheit, an exceedingly high temperature and one not typically achieved by the electric saunas that are installed in the United States. The use of the wood permits reaching a very high temperature, with the wood burning causing a pleasing aroma to waft through the sauna, while at the same time providing for the sounds of crackling and the like, all of which enhance the sauna experience.

Also saunas are typically located in woodland or remote scenic regions in Northern countries and/or European countries which serve as a getaway for the Northern countries and/or European countries populace, away from the city and away from the readily availability of electricity. In short, traditional Northern countries and/or European countries' saunas are wood fired, located remotely, preferably adjacent to bodies of water, and are to a large extent wood-fired to provide both the traditional experience of taking a high temperature sauna while at the same time being therapeutic.

However, in places where saunas are not plentiful, such as in the United States, there is a need to provide for the same type of experience as one would have in the Northern countries and/or European countries' countryside.

Present day saunas are usually fixed structures within a building and are electric powered. As a result such saunas cannot reach the temperatures associated with wood-fired saunas. The buildings which house the saunas are typically not in a woodland setting and are not wood-fired. Moreover, saunas in such buildings do not provide the ambience of a wooded or other scenic area much less one adjacent to a lake or a cold spring. Moreover the sauna may not be accessible to the elderly who may be in need of the type of therapy provided by the sauna experience.

Thus, a heretofore unaddressed need exists in the industry to address the aforementioned deficiencies and inadequacies.

SUMMARY OF THE DISCLOSURE

Embodiments of the present disclosure provide a mobile sauna apparatus. Briefly described, in architecture, one embodiment of the system, among others, can be implemented as follows. The mobile sauna apparatus includes a mobile vehicle having a vehicle body with a floor, roof and sidewalls. A sauna is mounted in the vehicle, the sauna having a heater with a heater orifice, and an extension from the heater orifice through one of the sidewalls of the vehicle and opening to the exterior of the vehicle. A stove pipe is mounted above the heater, the stove pipe surrounded by an insulating material, wherein the stove pipe extends through at least one of: the roof of the vehicle and one of the sidewalls of the vehicle, and wherein the insulating material is positioned between the stove pipe and the at least one of: the roof of the vehicle and the sidewall of the vehicle. The present disclosure can also be viewed as providing methods of providing a mobile sauna experience. In this regard, one embodiment of such a method, among others, can be broadly summarized by the following steps: providing a vehicle having a sauna with a heater; transporting the vehicle to a designated area; facilitating at least one individual to use the sauna; and after use of the sauna is complete, transporting the vehicle from the designated area.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
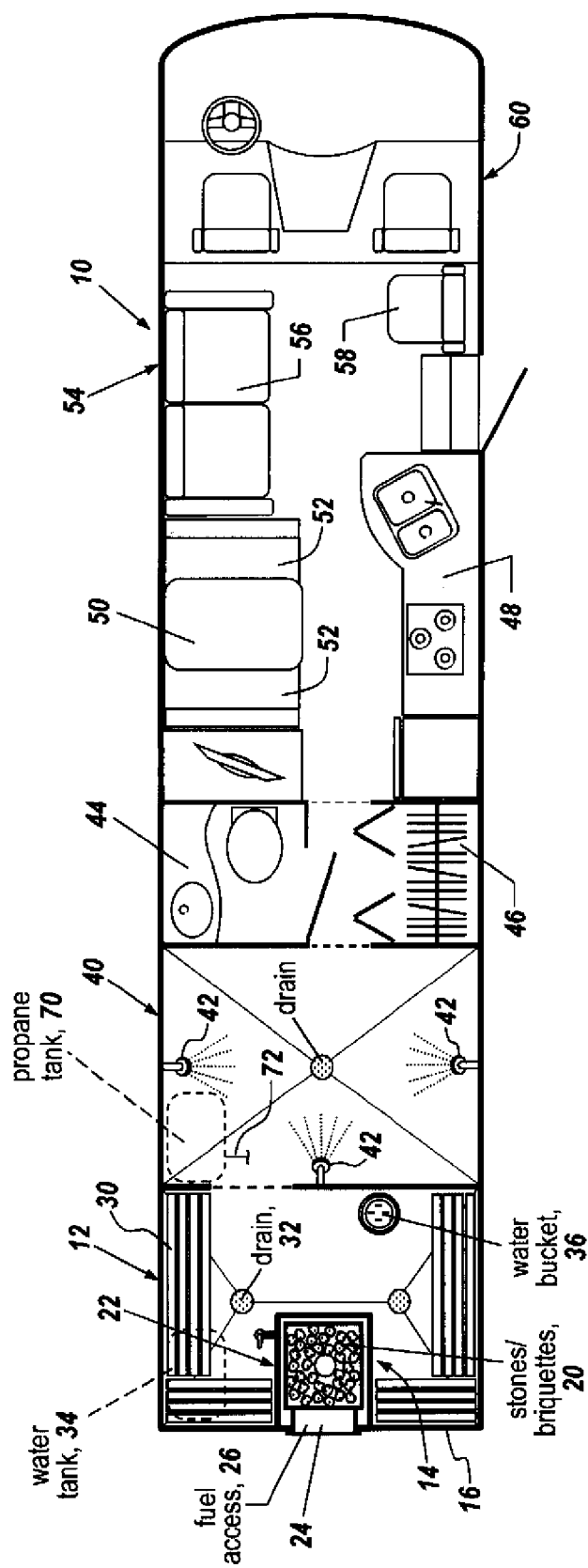
FIG. 1 is a diagrammatic top view of a mobile vehicle provided with an aft mounted sauna having a sauna firebox exposed to the exterior of the mobile vehicle body to permit loading of wood outside the mobile vehicle into the heater, with the exterior exposure of the firebox also accommodating a propane heater assembly as an alternative source of fuel.

In order to provide for an equivalent sauna experience outside of what is found in Northern countries and/or European countries, such as Norway and Finland, a mobile vehicle is provided with a wood-fired sauna, in one embodiment mounted to the rear of the mobile vehicle in which the sauna is surrounded by benches of abachi, a wood that remains cool in a sauna environment, a supply of water for replenishing a water bucket which is used to pour water onto the bricks of the sauna, as well as providing a separate area adjacent to the sauna within the mobile vehicle for cold showering such that if a lake or cold body of water is not available adjacent to the RV, those experiencing the sauna can cool down rapidly within the mobile vehicle.

In one embodiment, the sauna heater is provided with a rear extension such that the firebox of the heater is exposed exteriorly of the mobile vehicle body. In this way wood that fires the sauna can be loaded into the sauna firebox from outside of the mobile vehicle. In so doing the sauna firebox is provided with an extension to the door normally used for inserting for instance a propane-fired heating element, with the extension permitting access to the firebox from outside the mobile vehicle. The outside access permits conveniently loading logs into the firebox from outside the mobile vehicle.

This permits driving the mobile vehicle to a remote location and providing a source of fuel derived from a wooded location so that the benefits of a wood-fired sauna are achieved once the mobile vehicle is parked at a suitable scenic remote site.

The sauna heater in one embodiment is a bi-fuel heater which can accommodate both wood firing and gas firing as for instance by propane fired heater elements inserted into the cavity where wood would ordinarily be placed and burned.

By outfitting the mobile vehicle in the manner described above it is possible to provide the sauna experience in a remote location which may or may not have electricity available, but which provides a sauna experience, similar to what is found in Northern countries and/or European countries, when the mobile vehicle arrives on scene at the desired remote location.

It is noted that since the sauna may be both gas-fired and wood-fired, it is possible to heat up the sauna while the mobile vehicle is en route towards the intended destination. In so doing it is possible to insert the propane burners into the firebox and provide them with propane for fueling the heater while in transit, with the propane heater assembly being removed when on location and wood accessible at the remote location used to fuel and maintain the heat of the sauna.

In this manner individuals seeking the Northern countries and/or European countries' sauna experience may be transported by the mobile vehicle to a remote location, again preferably by a lake or source of cold water, take the sauna and then jump into the lake adjacent to the mobile vehicle.

Moreover, the subject system can be used by elderly individuals, mobile enough to enter the mobile vehicle so that they can be transported to a remote location and then experience the Northern countries and/or European countries' sauna as it was meant to be experienced but without having to construct a fixed sauna.

Alternately, the mobile vehicle may be provided as a mobile health care facility in which the Northern countries and/or European countries' sauna experience may be transported directly to the individual requiring the sauna experience such as aging individuals, for instance in a senior facility. In this instance the sauna may be preheated during transport to the senior facility, whereas wood may be added from the exterior of the mobile vehicle into the sauna firebox when the mobile vehicle is parked next to the senior facility. As a result, the aroma, sparks and high heat associated with the burning of the wood provide the needed therapy for the inhabitants of the senior facility.

Since the mobile vehicle is provided with a cold shower area adjacent to the sauna, the Northern countries and/or European countries' sauna experience of taking a sauna then being rapidly cooled can be provided within the mobile vehicle itself.

What is therefore provided is a mobile vehicle mounted sauna which in one embodiment is wood-fired to provide the super-heated atmosphere associated with Northern countries and/or European countries' saunas as well as the ambience thereof, with the mobile sauna being provided with cold showers to simulate jumping into a cold lake or river. A bi-fuel capability is provided in one embodiment in which the firebox of the heater may be provided with an extension so that its orifice extends to the exterior of the mobile vehicle so that the wood can be conveniently placed into the firebox, or so that a propane heating element can be inserted into the firebox, with the sauna being operable in one embodiment during transit.

FIG. 1 is a diagrammatic top view of a vehicle provided with an aft mounted sauna having a sauna firebox exposed to the exterior of the mobile vehicle body to permit loading of wood outside the vehicle into the heater, with the exterior exposure of the firebox also accommodating a propane heater assembly as an alternative source of fuel. As can be seen from FIG. 1, a vehicle 10 is provided with a sauna 12 having a heater housing 14 which is at the rear portion 16 of the vehicle. In one of many alternatives, the heater housing 14 and various components thereof may be located in other sections of the vehicle 10, including a middle section or a front of the vehicle 10. Similarly, a chimney or exhaust vent could be positioned through any of the sidewalls, rear or front walls, or any window of the vehicle 10.

The vehicle 10 may include a variety of types of mobile vehicle, including recreational vehicles, converted busses or tractor trailers, mobile trailers, trucks, or other vehicular devices. The heater has a receptacle for stones, rocks or briquettes 20 which are heated by either wood or propane in a heater 22 which has an extension 24 that goes from the body of the heater to the exterior of the mobile vehicle. This extension provides fuel access via a fuel access port 26 so that wood may be loaded into the sauna heater. A variety of types of fuel may be used with the sauna 12 including wood, propane, natural gas, charcoal, electric, other heat sources, or any combination thereof. When electric only fuel is used, a stove or exhaust pipe may be unnecessary, due to the lack of ventable fuel burning byproducts.

The sauna 12 area is provided with benches 30 which are made from wood such as abachi wood that does not heat up so that individuals can enjoy the sauna without burning their skin. Sauna 12 is provided with a plurality of drains 32 so that when water from a water tank 34 is channeled into a water bucket 36 and is thrown on the stones or briquettes 20, any remaining water can drain out of the sauna compartment. The water from the water tank 34 may be also utilized to cool down an individual in the sauna, it being understood that the subject sauna may produce temperatures within the sauna of up to 260 degrees Fahrenheit. It is noted that cool bodies of water may also be used to cool down an individual in the sauna. These cool bodies of water may be showers, pools, or any other water feature. The drains 32 can also be used to dispose of water used in the sauna for cleaning or for rapidly changing one's body temperature, among other uses of water in the sauna.

It is noted that in place of a traditional sauna 12, a steam room may be used with the vehicle 10 as well. The steam room is an enclosed space with large amounts of high-temperature steam, creating a high-humidity environment. The disclosure herein relative to a sauna 12 may be largely compatible with use of a steam room in the vehicle, any designs of which are considered within the scope of the subject disclosure.

Adjacent to sauna 12 is a shower area 40 having shower heads 42 which are used to simulate the experience of jumping into a cold lake or stream after a sauna, should such lake or stream not be available in the vicinity of the mobile vehicle.

In one embodiment, the mobile vehicle is provided with a bathroom 44, a closet 46, and a kitchen area 48, along with a settee 50 having benches 52 for dining purposes. Outside of the kitchen area is a lounge area 54 having a sofa 56 and a chair 58, all located behind the driving compartment 60 of the mobile vehicle.

Figure 2:
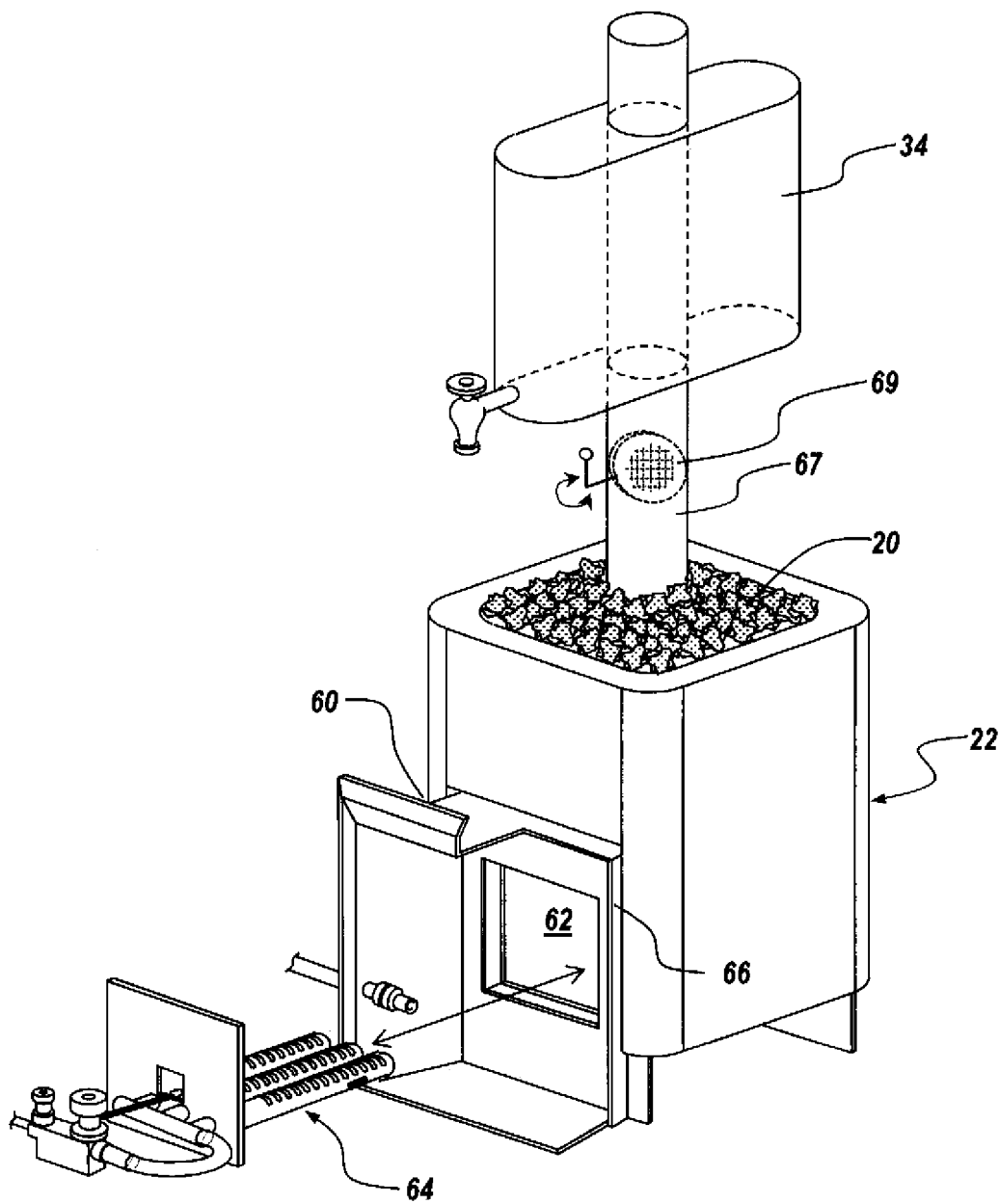
FIG. 2 is an exploded view of one embodiment of the sauna heater of FIG. 1 illustrating a fire box door and the insertion of propane heater tubes through the door for firing the sauna.

FIG. 2 is an exploded view of one embodiment of the sauna heater of FIG. 1 illustrating a fire box door and the insertion of propane heater tubes through the door for the firing the sauna. Referring now to FIG. 2, heater 22 of FIG. 1 is shown as having an internal firebox 62 into which can be inserted a propane heater assembly 64. This propane heater assembly 64 is inserted into the firebox 62 through extension 66 which provides access to the firebox 62 so that in one embodiment the subject sauna can be gas-fired from assembly 64. The propane heater assembly 64 may be connected to a propane tank, as is conventionally used for a remote fuel source in a variety of industries. The propane tank may be removable from the vehicle and connected to the heater 22 with a variety of hoses and pipes.

It is an important feature of the subject invention that extension 66 provides access from the exterior of the mobile vehicle to the firebox so that locally garnered wood can be utilized to fire the sauna.

Whether gas-fired or wood-fired, a stove pipe 67 is utilized to vent the hot gases from either the burning wood or propane out to the exterior of the mobile vehicle, with the stove pipe centered in the stones or briquettes that are at the top portion of the sauna heater.

FIG. 2 also includes a spark catcher 69 which is mounted within stove pipe 67. The spark catcher 69 may include a partition that can be added into the chimney that goes through the roof of the vehicle. For example, the partition may include little holes in it, or may be even thin grid made from mesh wire, and further include a little handle that comes on the outside of the chimney stove pipe 67, which can be used to rotate the spark catcher 69 within the stove pipe 67, i.e., rotate the spark catcher 69 approx. 90° within the stove pipe 67. The spark catcher 69 can be opened when the sauna is heating up with propane or closed when it's heating up with wood, which produces a lot of sparks going through the stove pipe 67 on the outside, which can end up on the roof of the vehicle, or could be dangerous in a dry forest.

Figure 3:
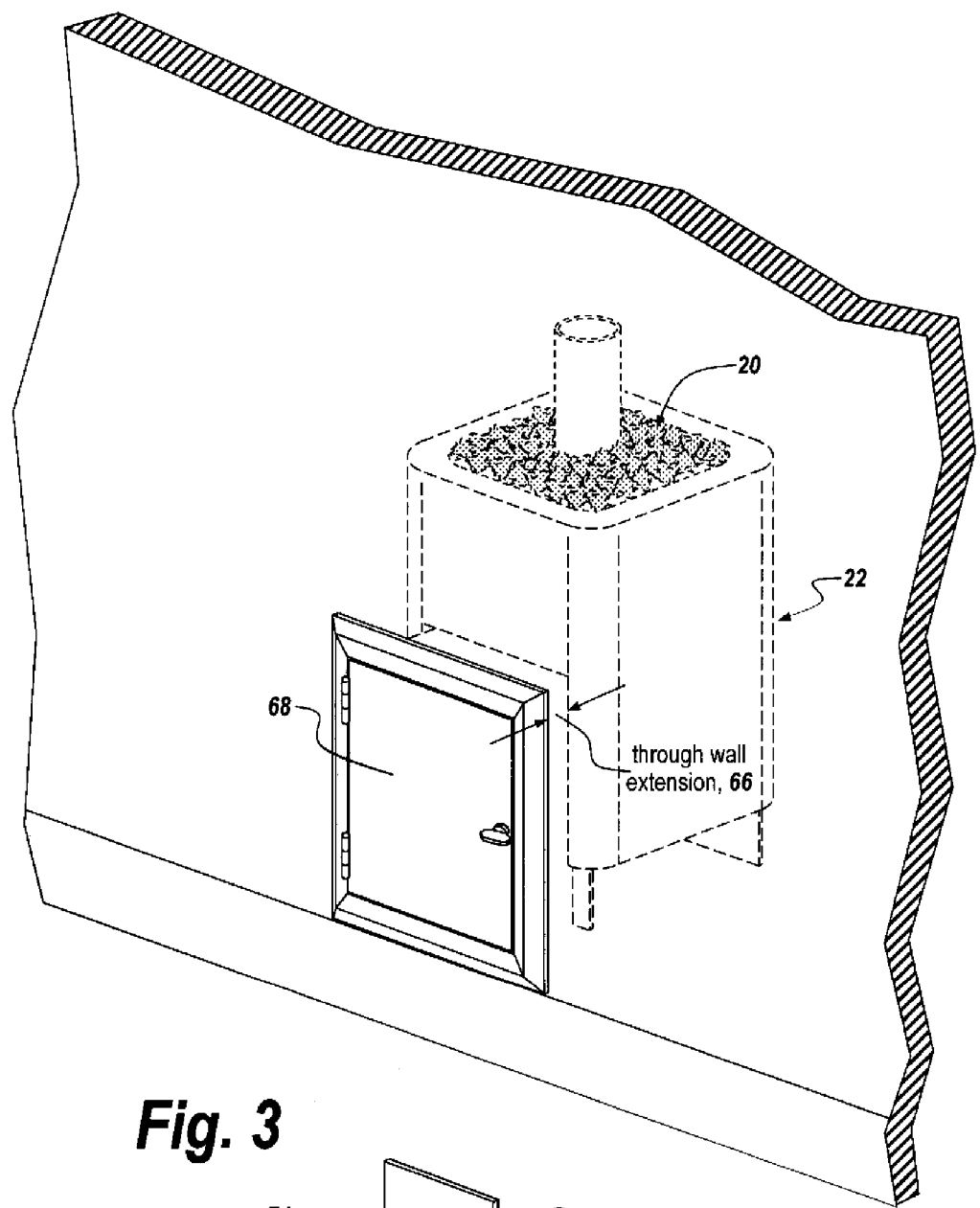
FIG. 3 is a diagrammatic illustration of the sauna of FIG. 1 being provided with an extension such that the firebox of the sauna is accessible from the exterior of the mobile vehicle, also illustrating the alternative of inserting a propane heater assembly through the extension and into the firebox of the sauna.
Figure 3:
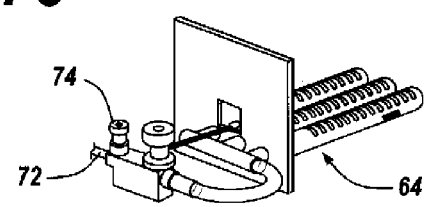

FIG. 3 is a diagrammatic illustration of the sauna of FIG. 1 being provided with an extension such that the firebox of the sauna is accessible from the exterior of the mobile vehicle, also illustrating the alternative of inserting a propane heater assembly through the extension and into the firebox of the sauna. Referring to FIG. 3, it can be seen that heater 22 is shown in dotted outline with access to the firebox being through a wall via extension 66 such that a propane heater assembly 64 or any wood gathered in the vicinity of the mobile vehicle can be burned in the heater. Moreover, as illustrated, a door 68 is provided to the exterior of extension 66 so that if it is desired to have the sauna preheated during transit the air flow at the back of the vehicle is prevented from entering into the firebox and putting out the fire.

It will be appreciated, and as can be seen in FIG. 1, there is a propane tank 70 which has lines 72 that are connected to an injector 74 associated with the propane assembly 64. As is usual, the propane heaters are provided with safety lockout valves such that if there is too much carbon monoxide the propane heater will shut down. Also over temperature protection is provided.

Figure 4:
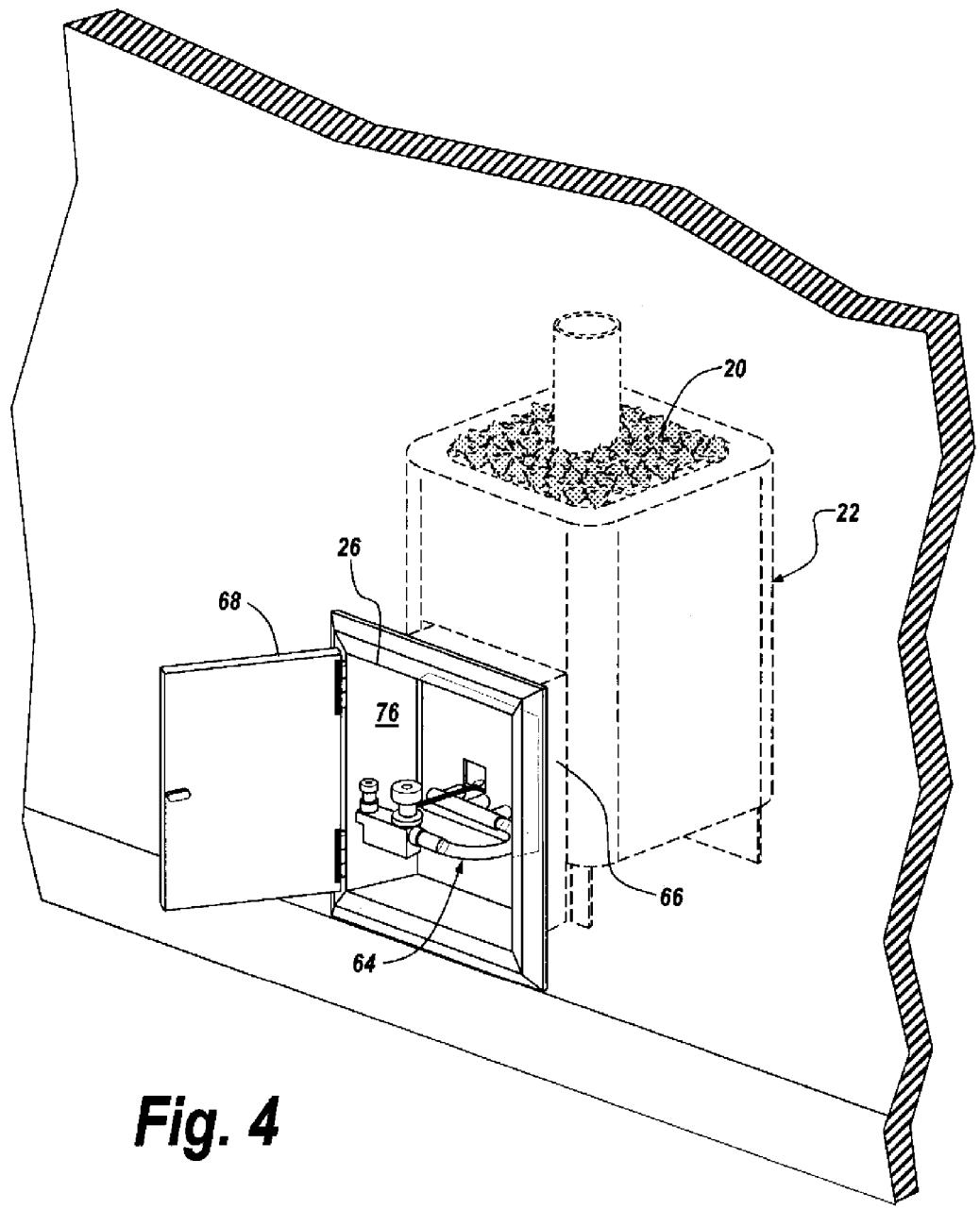
FIG. 4 is a diagrammatic illustration of the insertion through door of FIG. 3 of the propane heater assembly into the firebox of the sauna.

FIG. 4 is a diagrammatic illustration of the insertion through door 68 of FIG. 3 of the propane heater assembly 64 into the firebox of the sauna. Referring to FIG. 4, it can be seen that propane heater assembly 64 is installed such that its nozzles are within the firebox of heater 22 after having been inserted through the fuel access port 26, having opened door 68. The fuel from propane tank 70 via line 72 may be provided either through a wall 76 or through extension 66, or the propane line may be run externally of the mobile vehicle.

Figure 5:
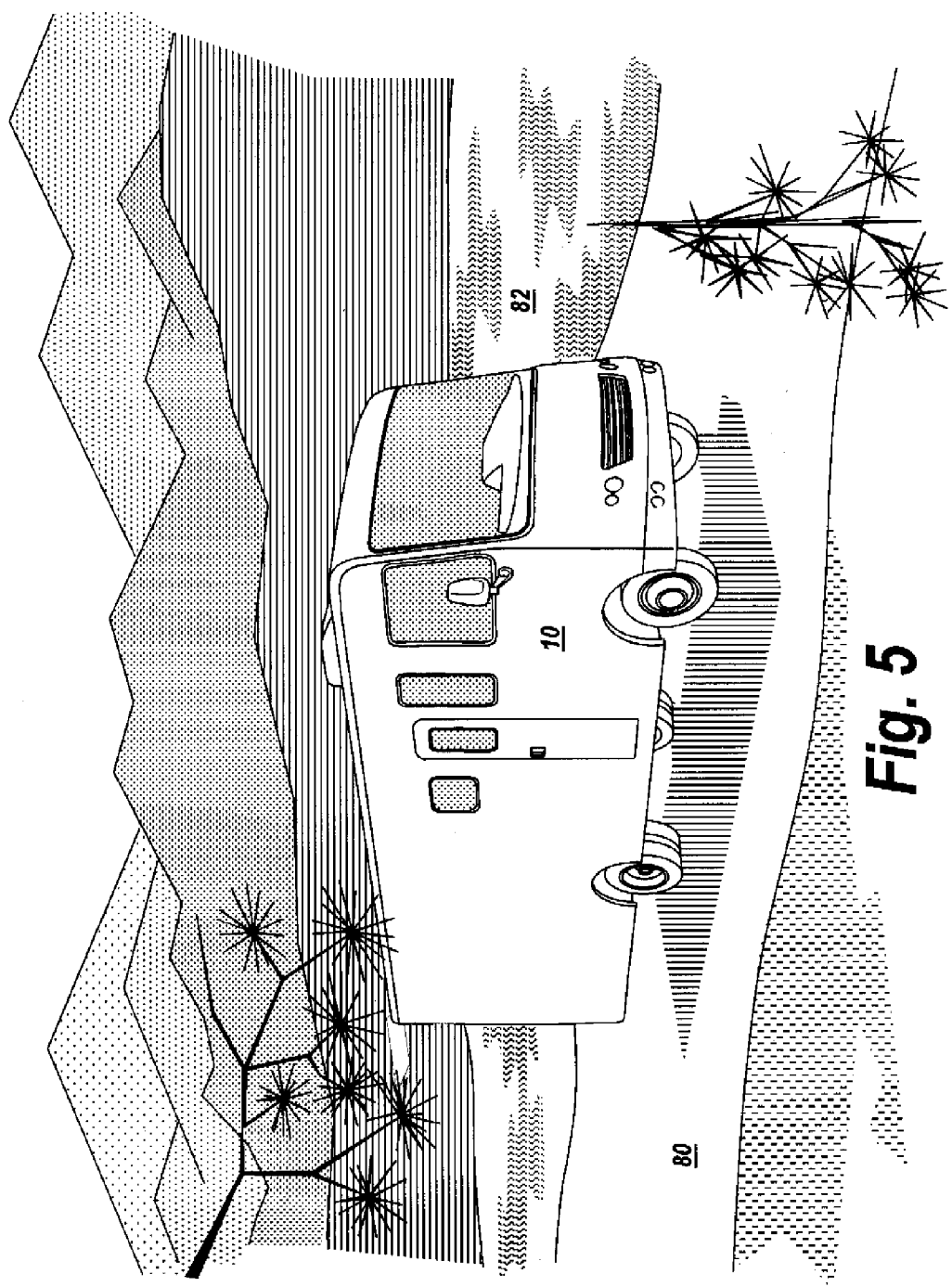
FIG. 5 is a diagrammatic illustration of a mobile vehicle that has been retrofitted with the sauna of FIG. 1, illustrating its proximity to a scenic wooded area and a lake.

FIG. 5 is a diagrammatic illustration of a mobile vehicle that has been retrofitted with the sauna of FIG. 1, illustrating its proximity to a scenic wooded area and a lake. As can be seen in FIG. 5, mobile vehicle 10 may be driven to a wooded location 80 in which there may be a lake 82 or stream into which sauna participants may bathe. Note the mobile vehicle may be transported to a scenic remote location at which there is no electricity and no other sauna facility. The area may include a scenic location adjacent to a cool body of water, whereby the individual, after experiencing the sauna, can exit the mobile vehicle and bathe in the cool body of water.

Figure 6:
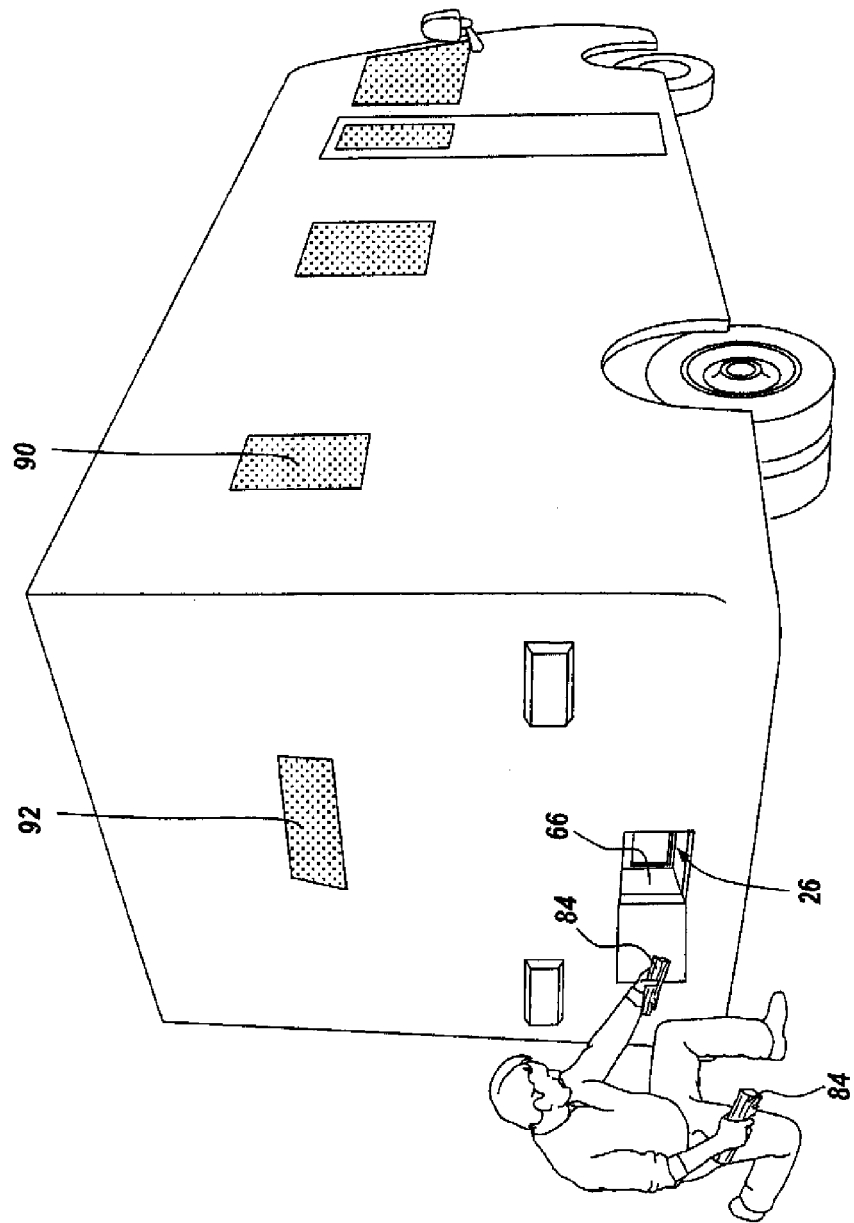
FIG. 6 is a diagrammatic illustration of the loading of wood from the exterior of the mobile vehicle into the firebox of the sauna that lies within the mobile vehicle so as to permit heating the sauna up to as much as 260 degrees F. while at the same time providing the smoke and the crackling experience of a wood fired sauna.

FIG. 6 is a diagrammatic illustration of the loading of wood from the exterior of the mobile vehicle into the firebox of the sauna that lies within the mobile vehicle so as to permit heating the sauna up to as much as 260 degrees F. while at the same time providing the smoke and the crackling experience of a wood fired sauna. While the mobile vehicle may have its own supply of fuel for the sauna, conveniently, wood 84 may be gathered at the scenic location and placed into the sauna heater through extension 66 and fuel access port 26 so the fuel for the sauna need not be transported but rather gathered locally.

Since the sauna is not electrically powered in the subject invention, it is possible for the sauna heater to be heated to in excess of 260 degrees Fahrenheit through the utilization of a very hot wood fire or in fact the utilization of the aforementioned propane fuel. This provides the sauna user with the Northern countries and/or European countries' experience of an extremely hot sauna, clearly hotter than that available from electrical power heat generation.

The vehicle 10 may include at least one window 90 positioned within at least one of the sidewalls of the mobile vehicle 10 and the sauna. The at least one window 90 may also be a rear window 92, wherein the rear window is positioned proximate to the heater, and wherein the rear window 92 further comprises a heatproof glass rated for use at 1,000° Fahrenheit Whether a sauna is used for recreational purposes or for therapeutic purposes it will be appreciated that mobile vehicle passengers may be transported from for instance a city to a scenic location where transported individuals may experience a sauna in a pastoral environment.

It will be appreciated that the stove pipe 67 is provided with surrounding insulation to be able to sustain the 260 plus degree Fahrenheit temperatures and further that the sauna may be anchored to the sides of the mobile vehicle body through insulating members so as not to overheat the mobile vehicle body.

In summary, what is provided is a mobile sauna which is outfitted so as to be able to wood-fire the sauna heater by gathering wood at a scenic site and firing the sauna with the gathered wood. It also has a bi-fuel capacity in which propane carried by the mobile vehicle may be used to fuel the sauna. The sauna is also provided with accoutrements such as cold showers and water supply to enhance the sauna experience.

A sauna and/or steam room offers significant benefits to a user's health. These benefits include:

Relieves stress: medical studies clearly show that stress in our daily lives affects our health. In fact, the vast majority of disease is stress related. The sauna provides stress relief in a number of ways: it's a warm, quiet space without any distractions. The heat of the sauna relaxes the body, improves circulation and stimulates the release of endorphins—the body's natural feel good chemical—providing a wonderful after sauna glow.

Relaxes muscles and soothes aches and pains in muscles and joints. Under high heat, the body releases endorphins—the body's naturally produced pain relieving chemical. Endorphins can have a mild and enjoyable tranquilizing effect and the ability to quell the pain of arthritis (and muscle soreness from an intense physical workout). Body temperature rises from the heat of the sauna, causing blood vessels to dilate and circulation to increase. The increased blood flow accelerates the body's natural healing process—soothing aches and pains and speeding up the healing of cuts and bruises. Following sporting activity, use the heat and steam of a sauna for muscle relaxation by helping to reduce muscle tension and eliminate lactic acid and other toxins.

Fights Illness: German sauna medical research shown saunas significantly reduced the incidence of colds and influenza. As the body is exposed to a sauna's heat and steam, it produces white blood cells more rapidly which in turn helps fight illness and helps kill viruses. Sauna can relieve sinus congestion from colds or allergies—especially when used with steam (add eucalyptus to the water for added benefits and enjoyment). The steam vapor action helps clear up uncomfortable congestion and is a wonderful part of the finish sauna experience.

Flushes Toxins: In today's lifestyle, many people don't actively sweat on a daily basis. Deep sweating has multiple health benefits. Regular sauna bathing provides the benefits derived from a deep sweat. In the heat of the sauna, the core body temperature begins to rise. The blood vessels dilate, causing increased blood flow. As heat from the blood moves toward the skin surface and the core body temperature rises, the body's nervous system sends signals to the millions of sweat glands covering the body. As the sweat glands are stimulated they produce sweat. Sweat production is primarily for cooling the body, and is composed of 99% water, deep sweating in a sauna can help reduce levels of lead, copper, nickel, mercury and chemicals—all toxins commonly picked up from our environment. There is no shortage of books from doctors and practitioners alike touting the benefits of detoxifying our bodies. As many doctors will attest, saunas are one of the best means to detoxify our bodies.

Improves cardiovascular performance: In response to the heat, the blood vessels near the skin dilate and cardiac output increases. Medical research shows the heart rate can rise from 60-70/min. to 110-120/min. in the sauna (140-150 with more intensive bathing), and can often sink to below normal after the cooling off stage. With regular sauna use, we not only train our heart muscles and improve the heart rate/cardiac output, but we also positively influence the regulatory system. Further cardiovascular conditioning occurs when the sauna is taken in multiple "innings", with sessions in the sauna separated by a cool shower or a dip into a cool pool or lake. Every time you rapidly change temperature (from hot to cool or vice versa), your heart rate increases by as much as 60% comparable to moderate exercise.

Induces deeper sleep: Research shows a deeper sleep can result from sauna use. In addition to the release of endorphins, when body temperature rises in the late evening, it will fall at bedtime, facilitating sleep. Numerous sauna bathers around the world tout the deep sleep they experience after sauna use.

Cleanses skin: Sauna is one of the oldest and most famous beauty and health treatments for the skin. When deep sweating occurs, the skin is cleansed and dead skin cells are replaced, keeping your skin in good working condition. Sweat rinses bacteria out of the epidermal layer and sweat ducts. Cleansing of the pores improves the capillary circulation and gives the skin a soft, beautiful appearance. When you sweat, the rush of fluid to the skin "bathes skin cells with a liquid rich in nutrients, which fills in spaces around the cells" and even plumps up tiny wrinkles. The nutrients and minerals in sweat are essential to maintaining the collagen structure of the skin. By continually flushing body waste through individual cells, one eventually brings back vitality, tone and a healthy glow to the skin.

Burn calories: Saunas are simply treated as another tool in our arsenal to burn additional calories. The sweating process itself takes a lot of energy. That energy is derived from the conversion of fat and carbohydrates in a process that burns up calories. According to the medical research, a moderately conditioned person can easily sweat off 500 grams in a sauna in a single session, consuming nearly 300 calories in the process. The body consumes calories by way of accelerated heart activity (cardiovascular section). As heart activity increases, demanding more oxygen, the body converts more calories into energy.

Effects of exposure to cold after sauna: A reported study from the Thrombosis institute in London into the effects of the cold bathing found that volunteers that followed a disciplined daily regime had increased immune white blood cells and the level of the body's natural blood thinning enzymes substantially increased, improving microcirculation. It also stimulated the production of hormones such as testosterone in men, and boosted women's production of estrogen. Cold water immersion raises thresholds of pain tolerance, aids in adaptation to cold, reduces muscle spasm, and can influence the frequency of respiratory infection and improve subjective well-being. Research has also shown that adaptation to cold through short term cold stimulus, as in cold swimming, or immersion (or showers), has the added benefit of improving the body's antioxidant capabilities, with increases in glutathione and reduction of uric acid, which may mean better handling of the stresses of illness. Those that are shown to involve reduced glutathione or increased glutathione use include: cardiovascular condition, pulmonary diseases, diabetes, inflammatory bowel diseases, cancer, osteoporosis, aging, and after pesticide exposure. Conditions involving oxidative stress include neuro degenerative diseases, CFS, bone fracture and others.

In addition, a sauna followed by a cold shower has been shown to reduce pain in rheumatoid arthritis. Cold bathing has also been found to improve microcirculation and reduce vasoconstriction and hypertension. Many symptoms of chronic illnesses may be due to vasoconstriction effects (e.g. cold sensitivity, physical pain, and even mood states) and sauna improves microcirculation and blood supply to constricted areas. Cold water exposure challenges both the neuro-endocrine and the immune systems, reduces stress hormones and attenuates their response, increases ADH and cortisol, and increases immunomodulatory cytokines. Cold water exposure and adaptation can modify the sensory functions of hypothalamic thermoregulatory centers to lower heat loss and produce less heat during cold exposure and have immunostimulating effects. The thermogenic action of adrenaline in cold exposure produces heat and reduces this stress hormone. An important effect is the ability of a sauna to use up excess sympathetic nerve tone in both the center and peripheral nervous system and just as importantly, use up excess levels of local tissue hormones involved in feedback loops to the hypothalamus, thus aiding recovery in chronic illness.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A mobile sauna apparatus comprising:
   a mobile vehicle having a vehicle body with a floor, roof and sidewalls;
   a sauna mounted in the vehicle, the sauna having a heater with a heater orifice, and an extension from the heater orifice through one of the sidewalls of the vehicle and opening to the exterior of the vehicle; and
   a stove pipe mounted above the heater, the stove pipe surrounded by an insulating material, wherein the stove pipe extends through at least one of: the roof of the vehicle and one of the sidewalls of the vehicle, and wherein the insulating material is positioned between the stove pipe and the at least one of: the roof of the vehicle and the sidewall of the vehicle.

2. The mobile sauna apparatus of claim 1, wherein said sauna is a bi-fuel sauna, the bi-fuel sauna further comprising a fuel source of at least two of: wood, pressed saw dust, propane, natural gas, charcoal, and electric.

3. The mobile sauna apparatus of claim 2, wherein the fuel source comprises a quantity of wood, and wherein the quantity of wood is loaded into the heater through the extension.

4. The mobile sauna apparatus of claim 1, wherein said mobile vehicle carries a supply of gaseous fuel, wherein a fuel line is connected between the supply of gaseous fuel and a gaseous fuel injection assembly positioned proximate to the heater.

5. The mobile sauna apparatus of claim 4, wherein the gaseous fuel injection assembly is positioned at least partially within the extension.

6. The mobile sauna apparatus of claim 5, wherein the gaseous fuel is delivered to the gaseous fuel injection assembly from the supply of gaseous fuel by the fuel line extending to the gaseous fuel injection assembly through the extension.

7. The mobile sauna apparatus of claim 1, further comprising a drain positioned within a floor of the sauna.

8. The mobile sauna apparatus of claim 1, further comprising at least one window positioned within at least one of the sidewalls of the mobile vehicle and the sauna.

9. The mobile sauna apparatus of claim 8, wherein the at least one window positioned within the at least one sidewall of the mobile vehicle and the sauna further comprises a rear window, wherein the rear window is positioned proximate to the heater, and wherein the rear window further comprises a heatproof glass rated for use at 1,000° Fahrenheit.

10. The mobile sauna apparatus of claim 1, wherein the sauna further comprises a quantity of rocks and a separate supply of water adjacent to the sauna, the supply of water having an outlet extending into the sauna, the sauna further comprising a bucket for receiving water from the supply of water for pouring over the quantity of rocks of the sauna.

11. The mobile sauna apparatus of claim 10, wherein the separate supply of water adjacent to the sauna is located vertically above the quantity of rocks, wherein the heater pre-heats the separate supply of water prior to being poured over the quantity of rocks.

12. The mobile sauna apparatus of claim 1, further comprising wooden benches in the sauna adjacent to the heater, wherein the wooden benches remain cool to the touch in a heated sauna environment.

13. The mobile sauna apparatus of claim 12, wherein the wooden benches are made from abachi.

14. A method of providing a mobile sauna experience, comprising the steps of:
    providing a vehicle having a sauna with a heater;
    transporting the vehicle to a designated area; and
    facilitating at least one individual to use the sauna; and
    after use of the sauna is complete, transporting the vehicle from the designated area.

15. The method of claim 14, wherein the at least one individual rides within the vehicle during the transportation to the designated area.

16. The method of claim 14, further including the step of turning on the sauna during transportation to the designated area to heat the sauna, wherein the sauna has a gas-fired burner and a supply of gas within the vehicle, and wherein turning on the sauna further comprises lighting the gas-fired burner.

17. The method of claim 14, wherein a fuel line is connected between the supply of gas fuel and fuel injection assembly positioned proximate to the heater.

18. The method of claim 14, wherein the sauna further comprises a stove pipe mounted above the heater, the stove pipe surrounded by an insulating material, wherein the stove pipe extends through at least one of: a roof of the vehicle and a sidewall of the vehicle, and wherein the insulating material is positioned between the stove pipe and the at least one of: the roof of the vehicle and the sidewall of the vehicle.

19. The method of claim 14, wherein the heater has a firebox with a firebox orifice connected to an exterior of the vehicle through an orifice in the sidewall of the vehicle, wherein wood is loaded from the exterior of the vehicle through the orifice in the sidewall of the vehicle, and into the firebox.

20. The method of claim 19, wherein the firebox orifice is connected to the exterior of the vehicle, utilizing an extension that passes through the vehicle sidewall.

* * * * *